June 22, 1954  S. R. PHIN ET AL  2,681,743
AUTOMATIC LABELING MACHINE
Filed March 6, 1950
10 Sheets-Sheet 2
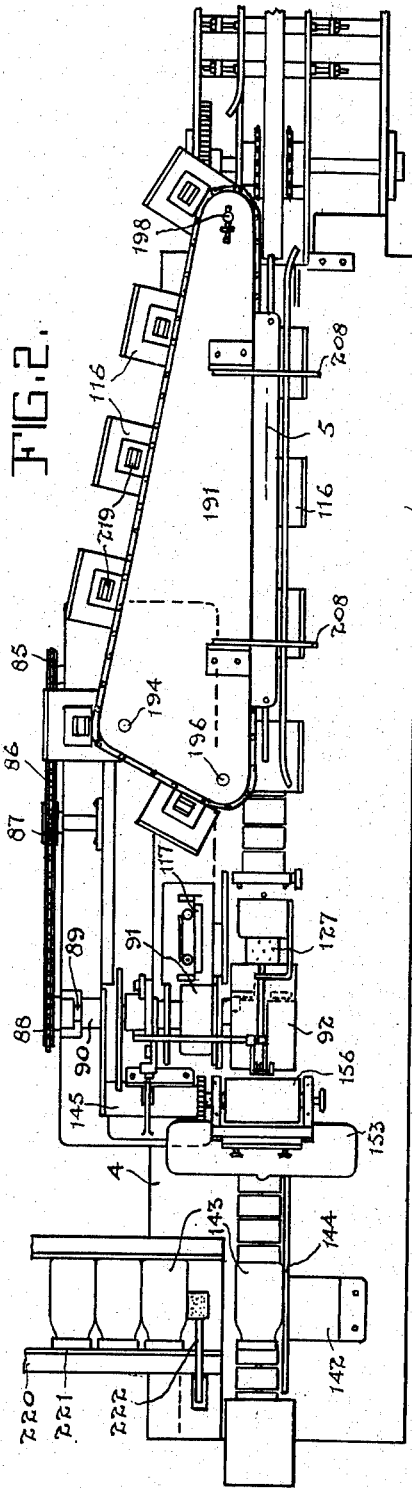
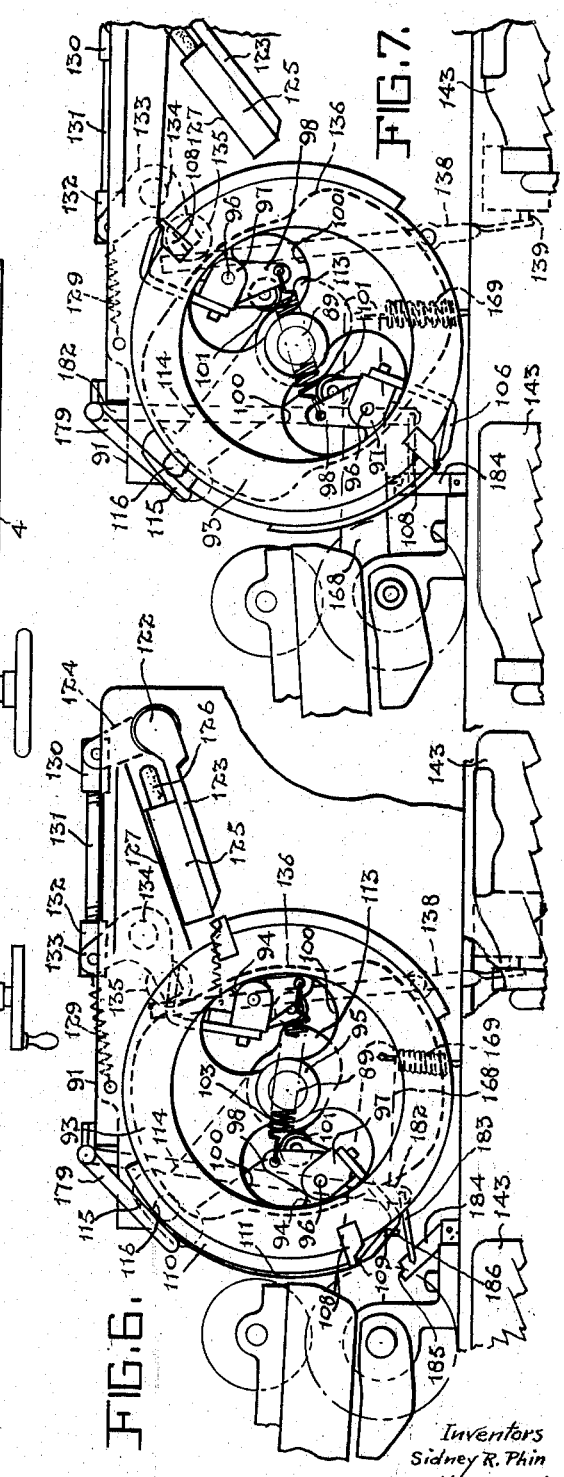
Inventors
Sidney R. Phin
Donald C. Caulford
by Douglas S. Johnson
atty

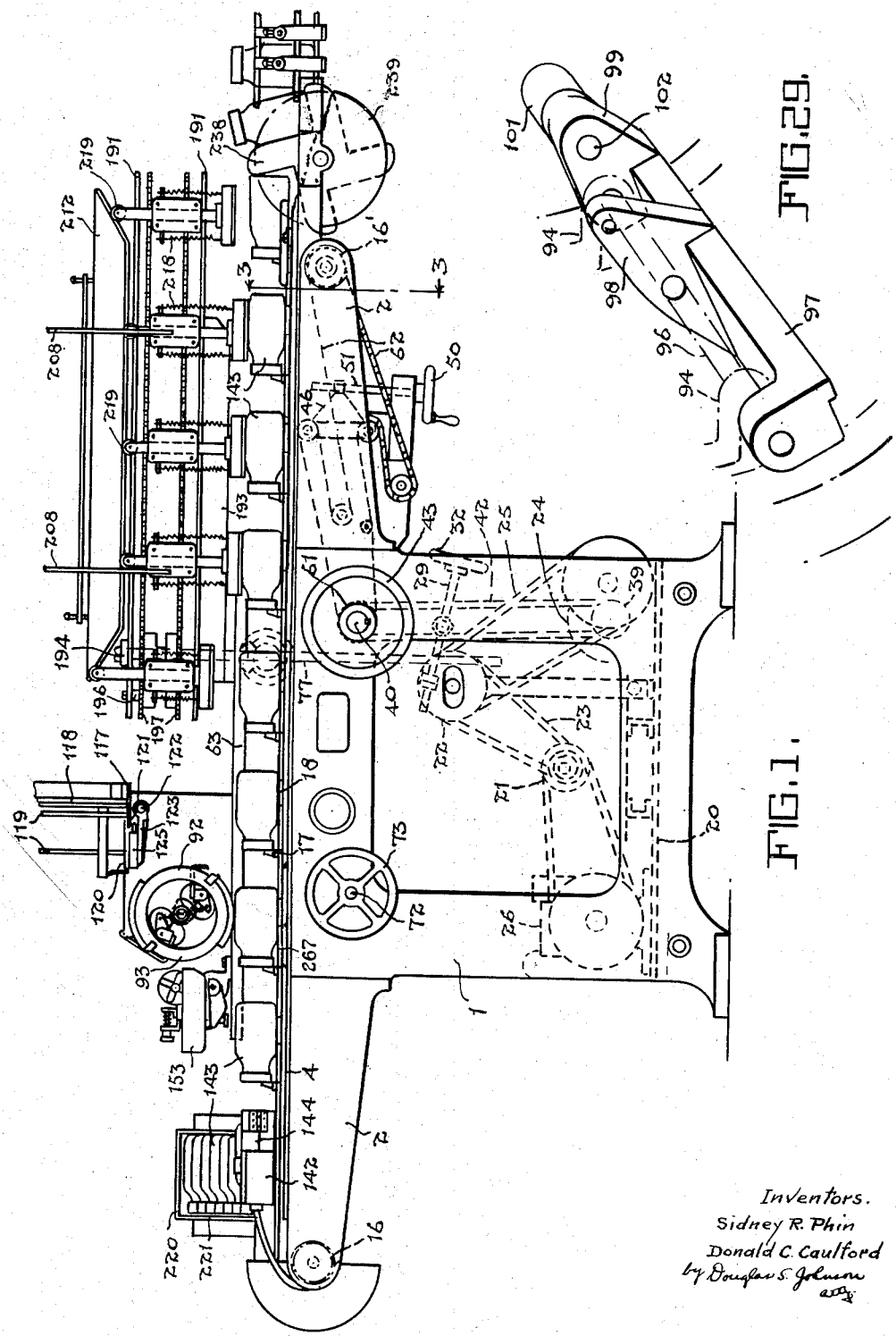

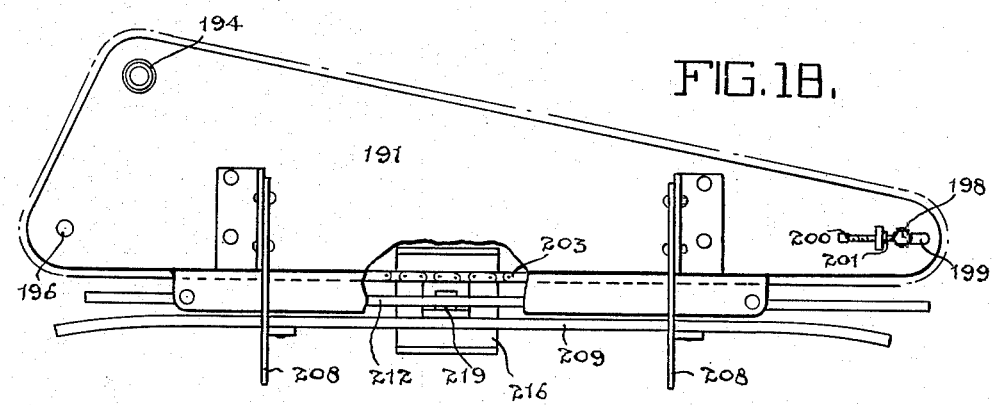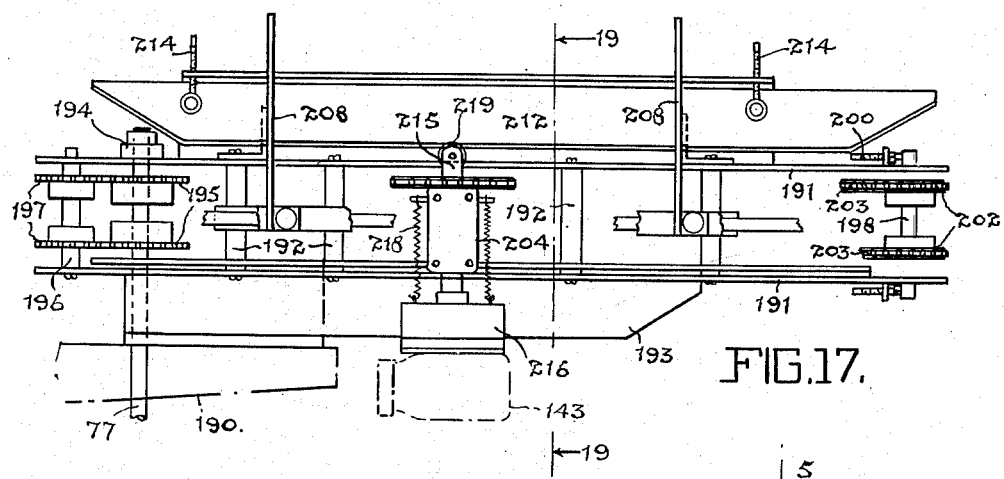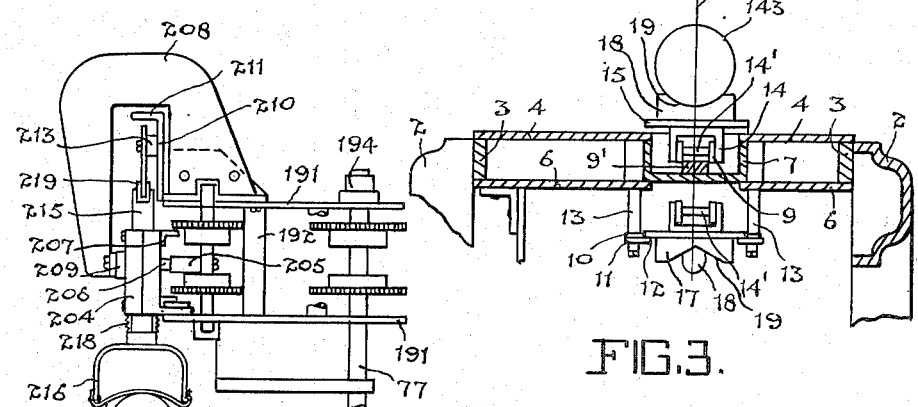

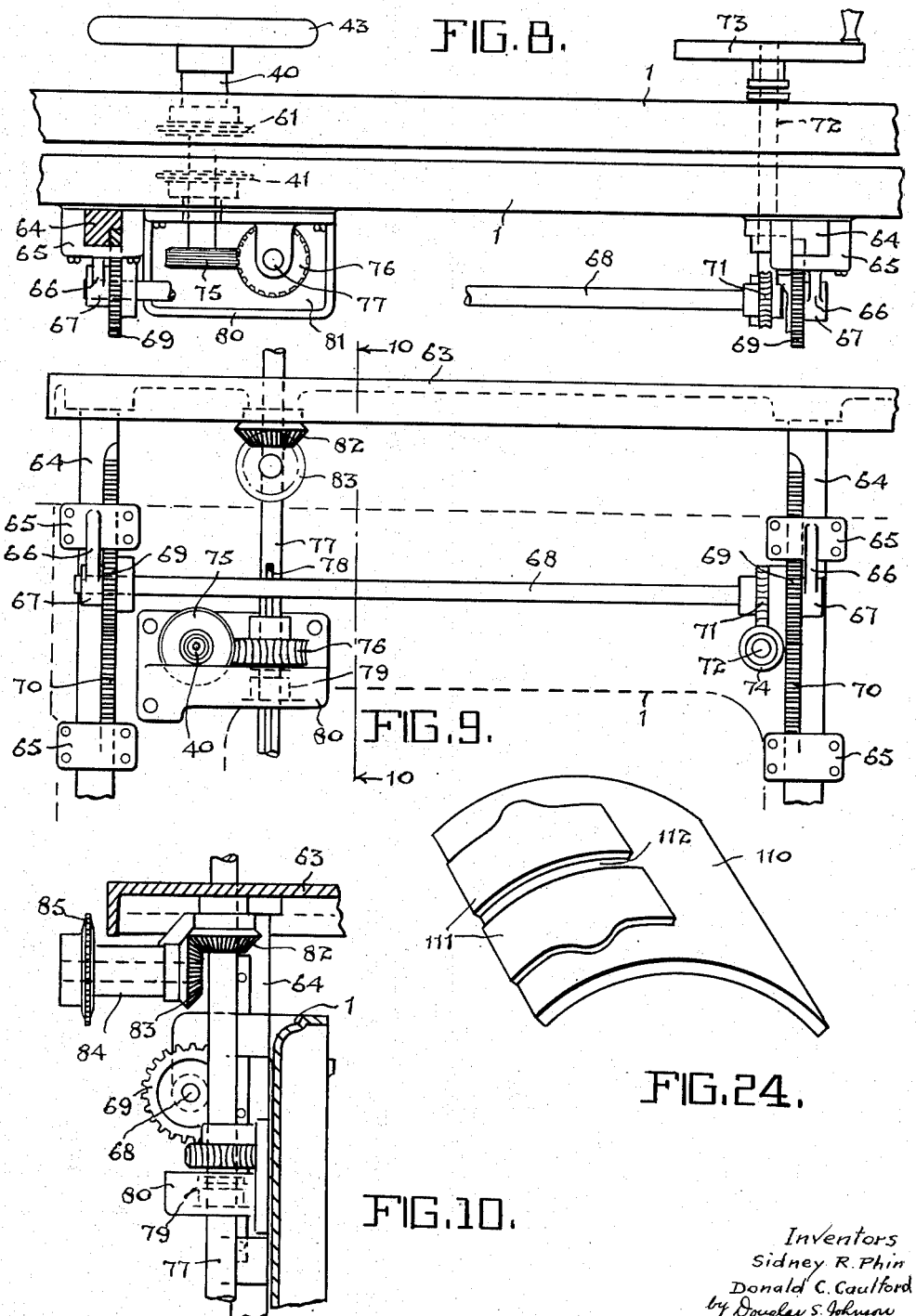

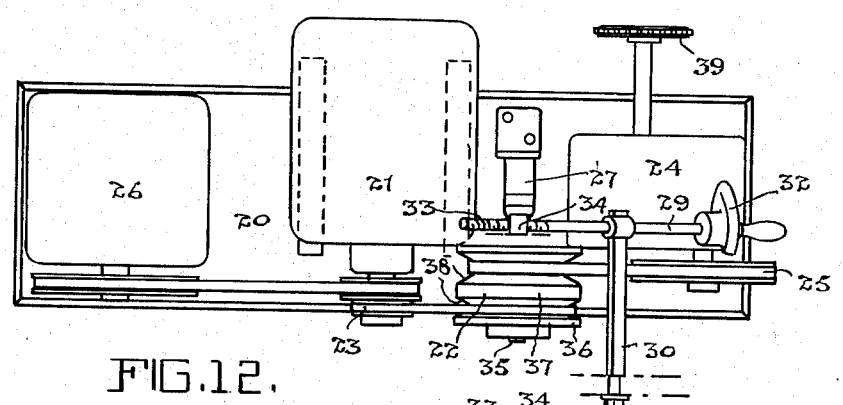
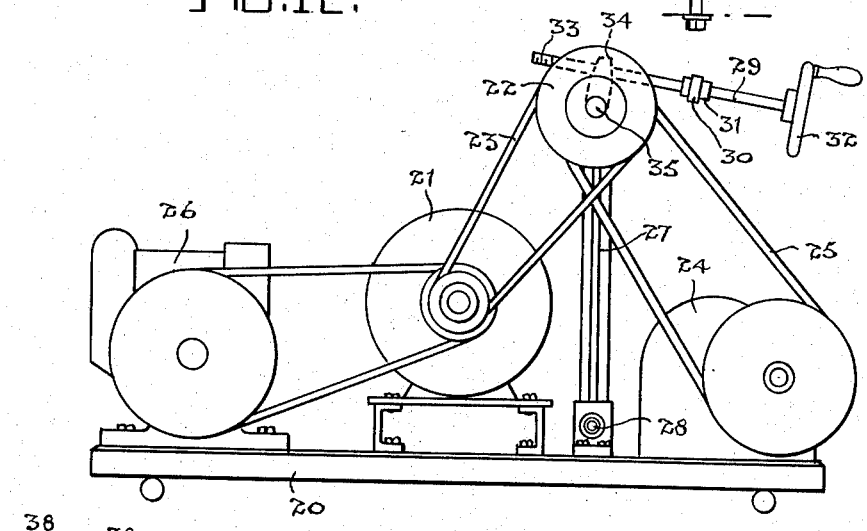
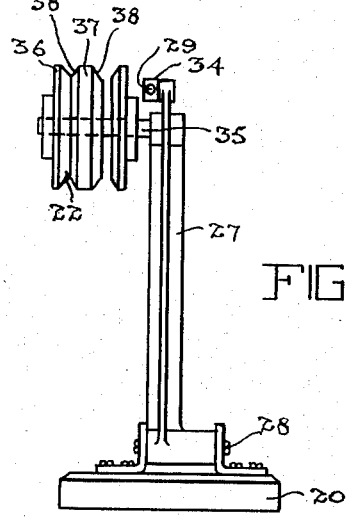
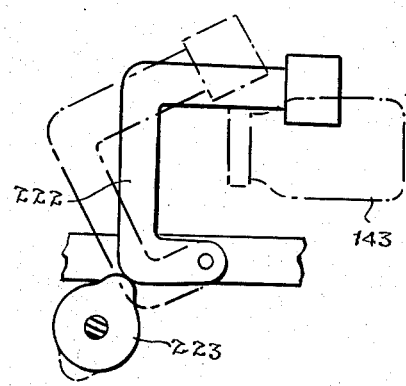

June 22, 1954  S. R. PHIN ET AL  2,681,743
AUTOMATIC LABELING MACHINE
Filed March 6, 1950  10 Sheets-Sheet 7

Inventors
Sidney R. Phin
Donald C. Caulford
by Douglas S. Johnson
atty.

June 22, 1954     S. R. PHIN ET AL     2,681,743
AUTOMATIC LABELING MACHINE
Filed March 6, 1950                          10 Sheets-Sheet 8
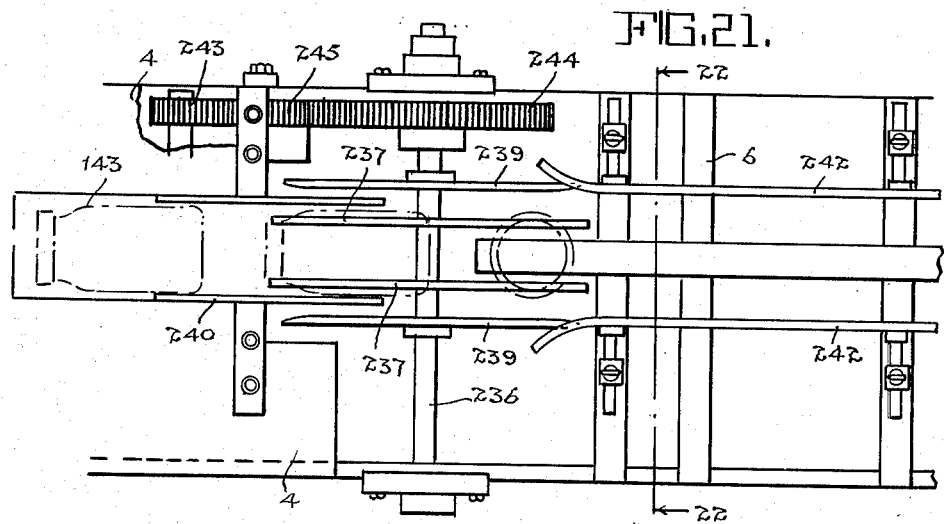
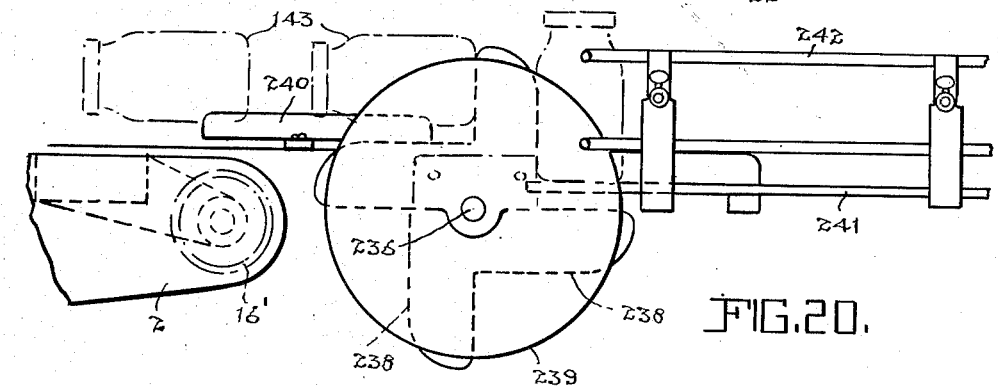
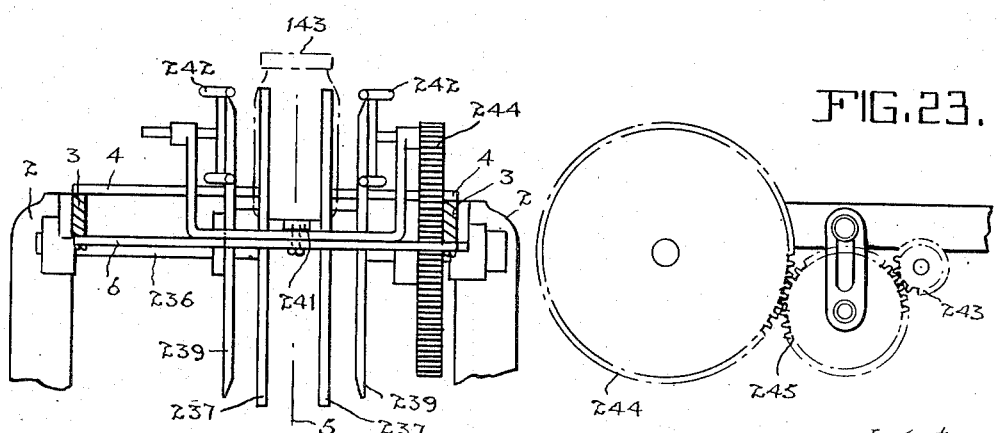
Inventors
Sidney R. Phin
Donald C. Caulford
by Douglas S. Johnson
atty June 22, 1954

S. R. PHIN ET AL 2,681,743

AUTOMATIC LABELING MACHINE

Filed March 6, 1950

Inventors
Sidney R. Phin
Donald C. Caulford
by Douglas S. Johnson
atty.

Inventors
Sidney R. Phin
Donald C. Caulford
by Douglas S. Johnson

Patented June 22, 1954

2,681,743

UNITED STATES PATENT OFFICE 2,681,743

AUTOMATIC LABELING MACHINE

Sidney R. Phin and Donald A. Caulford, Toronto, Ontario, Canada, assignors to Phin Sales Company, Toronto, Ontario, Canada Application March 6, 1950, Serial No. 147,916

11 Claims. (Cl. 216—55)

This invention relates to a machine for adhering labels to bottles, cans or other containers, and the principal object of the invention is to provide a completely dependable high capacity machine of this character which will be fully automatic to label bottles or the like in a continuously moving uninterrupted stream with the labels correctly and accurately positioned and securely adhered against accidental dislodgement under immediate handling for packaging and shipping.

Another important object is to provide a machine of the character described which will operate without fear of damage to the bottles or the like being labelled avoiding bottle breakage and yet utilizing sufficient pressure for an extended period to effect the requisite adhesive bond between the glued label and the bottle surface.

Still another important object is to provide a machine fully adjustable for the placing of the labels in any desired position on a bottle, can or the like.

It is another important object to provide a machine capable of labelling containers of different diameters, shapes and sizes.

Still another object is to provide a machine capable of labelling containers with labels of different sizes and shapes.

With regard to these latter three objects, one of the essential aspects of the machine is to provide for the rapid and simple adjustment for handling different container sizes and locating labels in different positions and to provide for the simple interchangement of machine parts for applying different types of labels with the prime object in view of providing a machine which can be both operated and adjusted by the ordinary workman with reliance, requiring a minimum of his skill and time and minimizing machine stoppage time when changing for the labelling of different containers.

Still a further and important object is to provide a machine which will accurately select a single label from a stack and will apply the label to the bottle with its contiguous adhesive bottle side carrying an adhesive coating applied immediately prior to placement on the container to have the correct viscosity and adhesive characteristics to ensure a firm bond with the container as it is delivered from the machine.

In connection with this latter object, another of the important aspects of the invention is to provide an interdependence of the machine operation sequences to automatically suspend selection of the labels for application upon interruption of bottle feed into or through the machine, and to suspend adhesive application upon suspension of label selection without stopping the machine or interrupting machine timing, eliminating label wastage and improper application of adhesive to foul the machine.

Another object of the invention is to provide handling of containers received at the machine in either upright or horizontal position to be fed through the machine by utilization of the required in-feed and out-feed mechanisms which may conveniently be synchronized to the machine feed system.

The principal feature of a machine in accordance with this invention resides in the provision of co-ordinated mechanism effecting the moving of containers with their surfaces to be labelled oriented in the direction of motion, the carrying of labels into engagement with the container surfaces while moving at the same surface speed as the containers and the application of pressure to maintain the label in intimate pressure contact with the container surface for a period while moving sufficient to establish a firm adherence therebetween before being discharged.

The co-ordinated mechanisms according to the invention comprise an endless carrier for container feed across a bed plate, a drum mechanism arranged above the carrier and driven to have the same surface speed as the carrier and including means to carry a label to and deposit it on each of the containers passing therebeneath, and a series of vertically reciprocal presser elements moving on an endless carrier above and at the same surface speed as the container over an extended length of their travel and operated downwardly into label pressing relation upon arriving over the containers.

Associated with the driven mechanism the machine includes a label magazine, a sucker arm for withdrawing a single label from the magazine to be picked up by the drum magazine, and a glue pot assembly movable to apply adhesive to the unprinted surface of the picked up label as the drum mechanism carries it to the container.

It is another important feature of the invention to provide a control operator for the sucker arm to prevent its operation to withdraw a label upon interruption of feed of bottles or containers into the machine.

Another important feature resides in providing a control operator for the glue pot assembly controlled by a feeler mechanism detecting absence of a label on the driven mechanism to prevent operation of the glue pot to prevent undesirable application of adhesive to the drum surface.

Another important feature of the invention resides in a novel control arrangement for the bottle feed conveyor to effect relative movement between the conveyor container holders and drum surface and presser elements so that the position of the bottle or container arriving beneath the drum can be adjusted to place the label correctly on the bottle surface.

A still further important feature consists in forming the drum mechanism in replaceable segments so that the label receiving surface of the drum can be quickly changed to suit the label shape and size to be applied.

It is a further feature of importance to provide for the co-ordinated relative vertical motion of the drum and presser assembly to accommodate the different sizes of containers to be handled.

A still further feature consists in providing a novel "paddle wheel" assembly for feeding upright bottles and the like into the machine to be transferred through the machine in a horizontal position for labelling and ejecting from the machine in correct aspect for desired handling or packing.

These and other objects and features of the invention and novel constructions of the machine parts will become apparent with reference to the accompanying drawings in which:

Figure 1 is a front elevational view of the machine.

Figure 2 is a plan view.

Figure 3 is a cross sectional view taken on the line 3—3 of Figure 1.

Figure 6 is a view similar to Figure 4 but showing the drum advanced to a different position.

Figure 7 is a view similar to Figures 4 and 6 showing the drum further advanced.

Figure 8 is an enlarged fragmentary plan and horizontal section of the central portion of the machine beneath the glue pot assembly and presser assembly.

Figure 9 is a rear elevation of a portion of the machine shown in Figure 8.

Figure 10 is a vertical section on the line 10—10 of Figure 9.

Figure 11 is an enlarged side elevational detail of the speed changing mechanism.

Figure 12 is a plan view of the mechanism of Figure 11.

Figure 13 is an elevational detail of the swinging arm and pulley assembly of the mechanism of Figures 11 and 12.

Figure 17 is an elevation on an enlarged scale of the presser pad assembly.

Figure 18 is a plan view of the assembly of Figure 17.

Figure 19 is a vertical section on the line 19—19 of Figure 17.

Figure 20 is an enlarged elevational detail of the discharge end of the machine illustrating the paddle wheel assembly for righting bottles or the like delivered from the machine.

Figure 21 is a plan view of the mechanism of Figure 20.

Figure 22 is a vertical section on the line 22—22 of Figure 21.

Figure 23 is an elevational detail of the drive of the paddle wheel discharge of Figures 20–22.

Figure 24 is a perspective view of one of the peripheral drum segments carrying the label pad cut to fit the label to be used.

Figure 25 is an elevational detail of the magazine latch for controlling feed in the magazine feed of Figures 1 and 2.

Figure 29 is a perspective view of one of the gripper jaws.

Figures 4, 5:
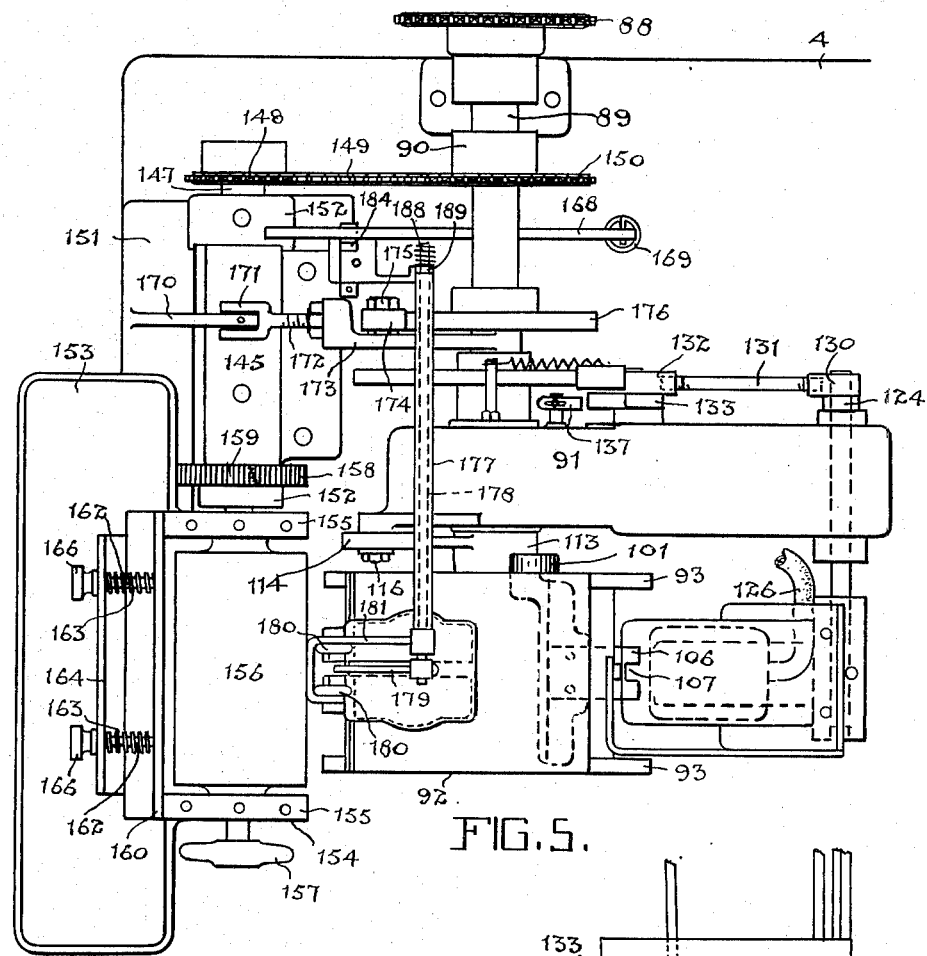
Figure 4 is a side elevational detail of the glue pot assembly label drum mechanism, label magazine and sucker arm.
Figure 5 is a plan view of the assembly of Figure 4.

Referring to the drawings, the framework of the machine comprises a pair of identical upright frames 1 shown in elevation in Figure 1 and transversely spaced as shown in Figure 2.

Extending outwardly from each end of each frame is an arm 2. Secured to the inner faces of the frames 1 and arms 2 at their upper edges are longitudinal rails 3, Figure 3, and secured thereto are plates 4 which terminate each side of the centre line 5 of the main machine framework.

Extending across between the rails 3 at spaced intervals are transverse spacing bars 6. Supported by these spacers and arranged between the plates 4 is a protective trough formation 7 which extends longitudinally of the machine to define a housing and guide for the endless carrier generally designated at 9 operating longitudinally of the machine. Forming the guide for the return reach of the carrier 9 are bars 10 and 11 defining a guide ledge 12 and supported on the hangers 13.

The endless carrier 9 is a flat top roller conveyor chain in which the chain lugs 14 carry the transverse plates 15 which overlie plates 4, and the rollers 14' of which ride on the rail 9' in travel across the upper surface of the main frame assembly and which ride on the guide ledges 12 in returning beneath the plates 4.

Figure 26:
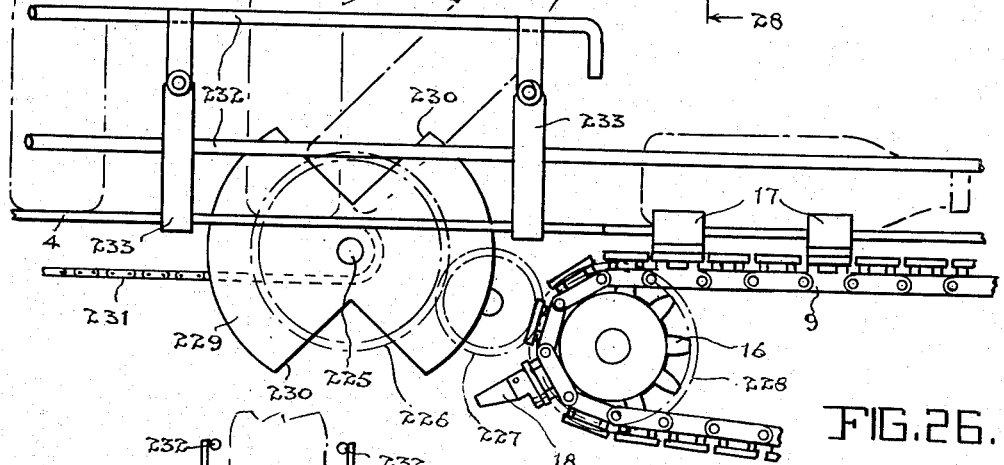
Figure 26 is a side elevational detail on an enlarged scale of an in-feed mechanism used in place of the magazine of Figures 1 and 2 where the bottles or containers to be labelled are fed into the machine in an upright position.

The endless conveyor chain operates over sprockets 16 at each end of the machine, the details of the chain and sprocket at the entry end of the machine being shown particularly in Figure 26.

On certain of the plates 15 are mounted removable lugs 17 to suit the containers to be handled, and the plates immediately forward of the lugs 17 are provided with metal V blocks 18 having a V-shaped upper face 19, Figure 3.

Spacing the upright frames 1 additionally to the bars 6 is the supporting platform 20 carrying the machine power drive, including, as shown in Figures 1 and 11, a motor 21, a variable drive mechanism 22 driven by the motor through a belt 23, and a reduction gear 24 driven from the variable speed control mechanism 22 through the belt 25. Also operated from the motor 21 is a vacuum pump 26 to provide a vacuum for withdrawing a label from its magazine as hereinafter described.

The variable speed drive mechanism 22 consists of a pivoted bracket arm 27 swingable about its pivot 28 at the platform 20 and operated by the control shaft 29 passing through and rotatably supported by the arm 30 carried by the frame 1 and anchored against longitudinal movement by the nut 31 each side of the arm 30. This control shaft operated by the hand wheel 32 has a threaded end 33 which operates through the threaded block 34 pivoted to the bracket arm 27. The operation of the shaft 29 therefore controls swinging in position of bracket arm 27.

Mounted on the shaft 35 carried at the upper end of the arm 27 are spaced outer pulley wheels 36 and centre floating pulley 37 oppositely bevelled on opposite faces at 38 to provide upon movement laterally on shaft 35 variable pulley diameter.

By operating control shaft 29 tension of 23 is varied, also tension on belt 25 to locate floating pulley 37 to give the desired pulley ratios between the variable speed mechanism 22 and the motor and reduction gear as is well understood in the art.

Driven by the gear assembly 24 (not shown in detail) is a sprocket 39, Figure 12, arranged adjacent the rearward frame 1.

Journalled in the frame 1 is the main drive shaft 40, Figures 1 and 8, extending transversely of the machine and carrying adjacent the rear frame a sprocket 41 engaged by the chain drive 42 operating between the sprockets 41 and 39. The main drive shaft 40 projects forwardly of the machine and is provided with a hand wheel 43 for manual machine operation.

*Carrier timing mechanism*

Figure 15:
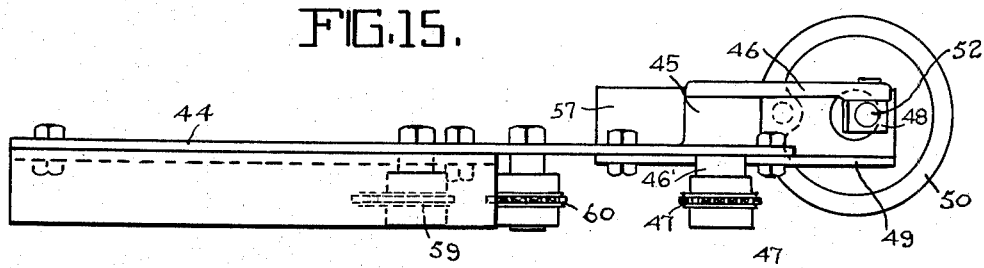
Figure 15 is a plan view of the mechanism of Figure 14.
Figure 14:
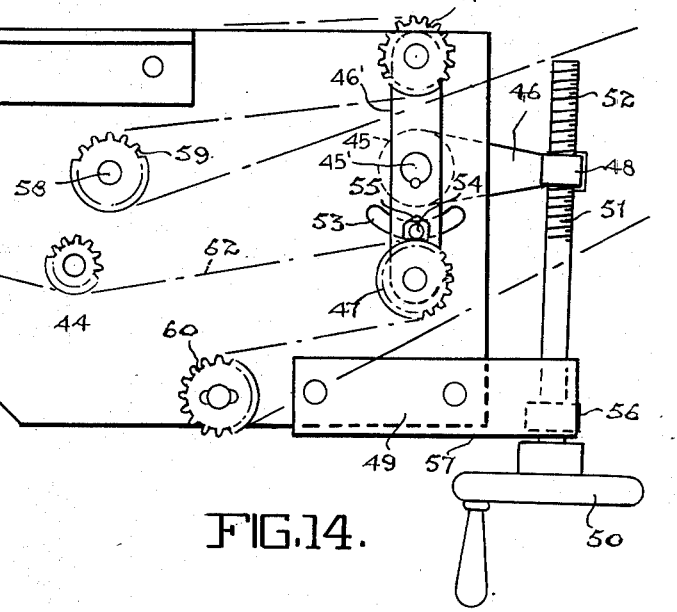
Figure 14 is an enlarged side elevational detail of the mechanism for adjusting the position of the endless carrier in relation to the labelling drum and presser pads.
Figure 16:
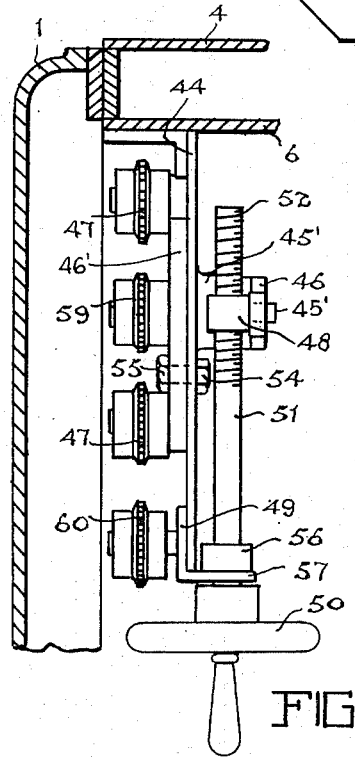
Figure 16 is an end elevational detail of the mechanism of Figures 14 and 15 showing the supporting machine structure in transverse section.
Figure 30:
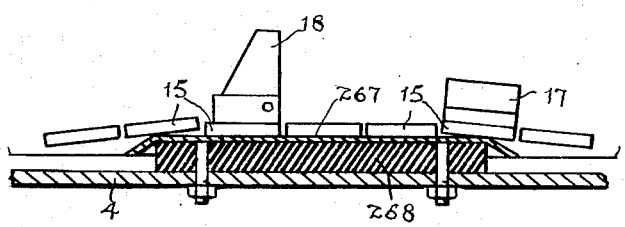
Figure 30 is a longitudinal vertical sectional detail through the main frame platform immediately beneath label drum showing the wear strips beneath the conveyor chain supporting the container while being labelled.

*Figures 14–16*

Suspended on the underside of the spacing bar 6 is a flanged bracket plate 44 extending longitudinally of the machine. Pivoted in the boss 45 of plate 44 is a rock arm 46 operating through shaft 45' and arm 46' carrying sprockets 47 journalled at the ends.

The outer end of the arm 46 carries a threaded block 48 and carried in bracket arm 49 and operated by a handle 50 is a control shaft 51 having a threaded end 52 threaded through the block 48 to rock the rock arm 46.

The plate 44 is provided with an arcuate slot 53 concentric with the boss 45 and bolt 54 and lock nut 55 carried by the arm 46 and operating in the slot 53 serve to lock the rock arm in adjusted position.

A collar 56 arranged on control shaft 51 bears on flange 57 of bracket arm 49 to maintain the control shaft against displacement vertically in the operation of the rock arm 46.

Mounted on a stud 58 is an idler sprocket 59 while a further idler sprocket 60 mounted for adjustment longitudinally of the plate 44 is arranged beneath the lower of sprockets 47.

Mounted on the main drive shaft 40 and aligned with sprockets 47, 59 and 60 is a sprocket wheel 61 and these sprockets align with sprocket 16' of the endless carrier mechanism 9 at the discharge end of the machine.

The drive between the main drive shaft 40 and sprocket 16' comprises the chain drive 62 threaded as illustrated particularly in Figure 14 around the main drive shaft sprocket 61, upper sprocket 47 carried by rock arm 46, then around idler sprocket 59 to sprocket 16' at the discharge end of the machine, back to idler sprocket 60, around lower sprocket 47 of the rock arm and thence returning to sprocket 61.

It will be seen that by rocking arm 46 the sprocket 16' can be retarded or advanced relative to sprocket 61 so that the timing of the endless carrier mechanism can be adjusted in relation to the remainder of the machine mechanism.

*Labeller base and elevating mechanism*

Referring to Figures 1, 9 and 10, the labelling mechanism and pressure mechanism is carried on a base or platform 63 mounted on a pair of spaced rack bars 64 slidably mounted in brackets 65 secured on the rear upright frame 1.

The upper brackets 65 carry depending arms 66 formed with journal bosses 67 supporting shaft 68 carrying spaced pinions 69 meshing with the rack surfaces 70 of the rack bars (Figure 9).

The shaft 68 carries a worm gear 71 and extending transversely through and journalled in the upright frames 1 is a height control shaft 72 operated by hand wheel 73 and provided with a worm wheel 74 meshing with worm gear 71 (Figure 8). The operation of elevating shaft 72 therefore controls, through the pinions 69 and rack bars 64 described the elevation of the base or platform 63.

The mechanisms carried by platform 63 are driven from the main drive shaft 40 by the worm wheel 75 carried thereby and engaging a worm gear 76 mounted on a vertical shaft 77 (Figures 8, 9 and 10). The worm gear 76 is keyed on shaft 77 with keyway 78 permitting the shaft to slide vertically relative to worm gear 76 held from vertical movement by the journal collars 79 of a bracket 80 in which the shaft 77 is supported. The drives for the various mechanisms carried by the platform 63 are derived from the shaft 77 driven in synchronism with the main drive shaft 40, as hereinafter described. It will be seen that the bracket 80 includes an oil pan 81 containing oil for the lubrication of the worm wheels 75 and 76.

As shown in Figures 9 and 10, mounted on the vertical shaft 77 adjacent the platform 63 is a bevel gear 82 meshing with bevel gear 83 carried by a stud shaft 84 on which is mounted a sprocket 85.

A chain 86 meshing with this latter sprocket and passing beneath idler sprocket 87 adjustably mounted on platform 63 drives through sprocket 88, label drum shaft 89, extending transversely of the platform and journalled in bracket 90 and label drum bracket 91, Figures 2 and 5.

*Label drum and gripper mechanism*

Figure 32:
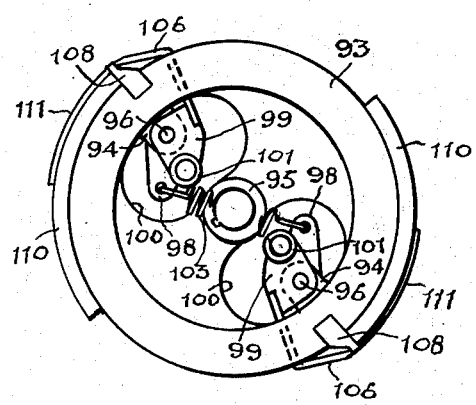
Figure 32 is a view similar to Figure 31 taken from the opposite end of the drum.
Figure 34:
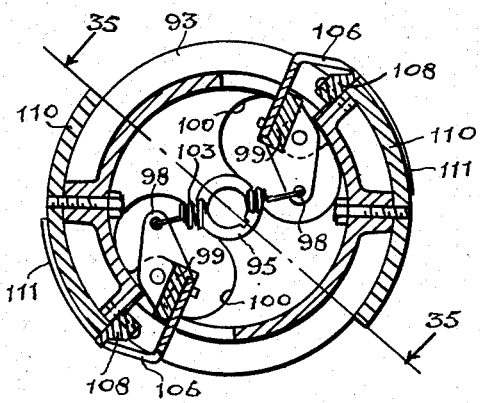
Figure 34 is a vertical section on line 34—34 of Figure 33.
Figure 33:
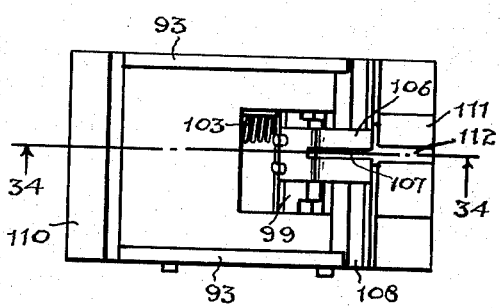
Figure 33 is a plan view of the drum.
Figure 35:
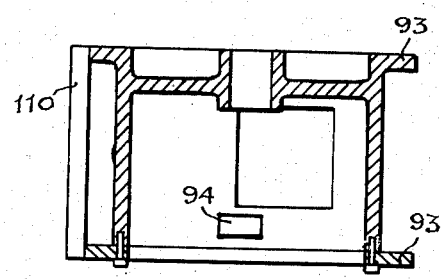
Figure 35 is a section on line 35—35 of Figure 34.

The label drum, Figures 4, 6, 7 and 24 and 31 to 35 and indicated generally at 92, is provided with peripheral flanges 93, Figures 33, 35. At each end of the drum at diametrically opposed relation are inwardly projecting pivot lugs 94. The inner end of the drum, Figures 32 and 35, is formed to provide boss 95 in which the label drum shaft 89 is received to fix the drum to the shaft.

Mounted in the pivot lugs 94 are shafts 96 on which are mounted bracket bars 97 carrying triangular lugs 98, and intermediate their length are lugs 99 extending through openings 100 in the inner face of the drum and carrying cam rollers 101 mounted on studs 102.

Connecting the triangular lugs 98 is a relatively stiff spring 103 tensioning the lugs inwardly.

Mounted on the bracket bars 97 in angular relation to lugs 98 are gripper jaws 104 which project through openings 105 in the periphery of the drum and have right-angularly turned ends 106 divided by slot 107, the purpose of which is hereinafter explained.

Extending transversely between the flanges 93 in diametrically opposite relation are anvil bars 108 with which the gripper jaws 104 co-operate. These anvil bars have a bevelled forward face 109 beneath the gripper jaws.

Mounted on the flanges 93 and abutting the rearward face of the anvil bars 108 are the arcuate segments 110 carrying the label pads 111 of hard rubber or like material. The label pad shapes will of course vary in accordance with the shape of the label to be deposited, the pad being the same configuration as the label but of slightly smaller dimensions so that the label edge will overlie and project beyond the pad edge. Regardless of the shape of the label pad 111 it is provided with a subdividing central slot or groove 112 aligned with slot 107 of the adjacent gripper jaw.

Mounted on but not fixed to label drum shaft 89 is cam 113 for actuating gripper mechanism and carrying arm 114 having slotted boss 115 at the upper end to receive clamping screw 116, clamping arm to the label drum bracket 91, permitting adjustment of cam 113 to operate the gripper mechanism, gripper jaws 104, through the cam rollers 101 carried by the bracket bars 97 and rolling over cam 113.

*Label magazine and sucker arm*

Returning to Figures 4 to 7, mounted on label drum bracket 91 is magazine bracket 117 supporting magazine 118 to overlie the label drum 92 and including guide rods 119 for guiding labels 120 to the bottom supporting ledge 121.

Mounted in bracket 117 below and to the rear of magazine 118 is a shaft 122 carrying at one end beneath the magazine a sucker arm 123 and carrying at the opposite end a lever arm 124. The sucker arm 123 has mounted thereon a vacuum chamber or box 125 connected by the hose line 126 with the vacuum pump 26 and perforated at its label contacting surface 127 to apply suction to the bottommost label of the magazine. Upon rocking of shaft 122 sucker arm 123 is actuated to pull down a single label to place the forward end of the label in position to be gripped by gripper jaws 104, as hereinafter explained.

Extending between lever arm linkage (crank 133) and projection 128 on label drum bracket 91 is a tension spring 129 acting to rock sucker arm 123 away from the magazine to the position shown in Figures 6 and 7.

Pivoted on lever arm 124 is a threaded block 130 receiving threaded rod 131 threaded in pivot block 132 carried by bell crank 133 pivoted at 134 to label drum bracket 91.

The bell crank 133 carries roller 135 which engages on cam 136 mounted on label drum shaft 89. An adjustable stop 137 carried by label drum bracket 91 limits the forward motion of the rod 131 and bell crank and consequent downward swinging motion of the sucker arm 123.

Pivoted adjacent the base of label drum bracket 91 is a vertical rock latch 138 controlled by a solenoid 139 to move upon energization of the solenoid clear of bell crank 133 having a head 140 normally held beneath bell crank 133 by spring 141 to prevent roller 135 from following cam 136 under urging of spring 129 until solenoid 139 is energized.

Energization of solenoid 139 is controlled by a switch 142, Figure 1, arranged to be operated by the entry of a bottle 143 or other container to be labelled into the machine. In Figure 1 a gravity feed magazine is illustrated, and as shown in Figure 2 the bottles 143 are delivered by gravity onto the endless carrier 9 to contact a hinge plate 144 forming the contact operator of switch 142. Thus until entry of a bottle into the machine the sucker arm is maintained up against the bottom of the magazine to prevent feed of a label to the label drum.

*Glue pot assembly*

Referring to Figures 4 and 5, journalled transversely of the platform 63 forwardly of the label drum mechanism in sleeve bracket 145 is a shaft 147 carrying at one end sprocket 148 driven by chain 149 and sprocket 150 mounted on the label drum shaft 89.

Mounted on shaft 147 is the glue pot support bracket 151 to be rocked about the shaft extending through the end bosses 152. Supported on bracket 151 is glue pot 153 projecting beyond the inner end of the bracket and formed with a forwardly extending portion 154 aligned with the label drum 92.

Journalled in collars 155 mounted on the glue pot portion 154 is a roller 156 having shaft extensions, the one carrying a hand knob 157 and the other the gear 158 meshing with gear 159 mounted on the glue pot control shaft 147.

Extending from a transverse bar 160 secured to the support bases 161 of collars 155 are threaded studs 162 on which are mounted the coil springs 163 and scraper 164 having a right angle portion 165 forming the scraping blade maintained adjacent the periphery of roller 156 by the adjusting stop nuts 166, being urged outwardly thereagainst by the springs 163.

The roller 156 dips into the liquid carried by the glue pot and is driven through the drive shaft 147 and meshing gears 158 and 159. The drive shaft 147 is in turn driven from the label drum drive shaft 89, which in turn is driven from the vertical shaft 77 by means of which the drive of the main drive shaft 40 is carried to the mechanisms mounted on the elevatable platform 63.

The whole glue pot assembly, including pot support bracket 151 and glue pot 153 secured thereto by clamp screw 167, together with roller 156 are adapted to rock on the glue pot drive shaft 147 into and out of engagement with the periphery of the label drum 92 in synchronism with the portion of the label drum carrying a label to be deposited arriving opposite the glue pot roller. To this end extending from one of the bosses 152 is a lever arm 168 pulled downwardly towards platform 63 by spring 169 to rock the glue pot assembly forwardly to bring the roller 156 in position to deposit an adhesive on a label.

Formed on the bracket 151 of the glue pot assembly is an upstanding web 170 to which is pivoted the forked head 171 of the threaded rod 172 on which is threaded a cam yoke 173 receiving the label drum drive shaft 89 in its yoked end and slidable relative thereto and carrying a roller 174 mounted on stud 175 and rolling on cam 176 mounted on the label drum drive shaft.

*Feeler mechanism*

Controlling actuation of the glue pot assembly to follow cam 176 under tension of spring 169 is a feeler mechanism shown in Figures 4 to 7 particularly. This mechanism comprises a tube 177 anchored to label drum bracket 91. Mounted in this tube is a shaft 178 carrying at one end a feeler arm 179 aligned to ride in the slot 107 of the gripper jaws and slot 112 of the label pad in the absence of a label.

Arranged to engage the label on each side of the feeler arm 179 are rollers 180 carried in roller bracket 181.

Secured to the shaft 178 opposite feeler arm 179 is a bar 182 carrying at its lower end a rod 183 pivoted thereto and to pivotal latch 184 mounted on platform 63 and formed with a stepped upper surface 185 which normally engages under set screw 186 extending through bracket portion 180 of lever arm 168.

Normally maintaining the latch 184 beneath set screw 186 to prevent movement of the glue pot into position to contact the label drum is a torsion spring 188 anchored to collar 189 on tube 177 and to shaft 178 through bar 182 to urge the feeler arm 179 into the slots 107 and 112 in the absence of a label. Upon presence of a label on pad 111 the feeler arm rides up the bevelled forward face 109 of anvil bar 108 onto the top of the label, rocking shaft 178 clockwise, operating bar 182 to force latch 184 from beneath set screw 186 to permit the glue pot assembly to follow cam 176 to apply adhesive to the label.

*Pressure unit assembly*

Mounted on a bracket 190 carried by platform 63 are a pair of vertically spaced horizontal plates 191 of triangular formation separated by spacers 192, as shown particularly in Figures 17 to 19.

Depending from the underside of the lower of the plates 191 is a reinforcing rib 193.

The vertical shaft 77 carrying the drive from the main drive shaft 40 to the mechanisms of the upper platform 63 extends through the plates 191 adjacent one apex thereof, terminating in the fitting 194. Mounted on shaft 77 between plates 191 are a pair of sprockets 195.

Journalled between plates 191 at the apex and adjacent shaft 77 is shaft 196 having mounted thereon idler sprockets 197. At the remaining apex an idler shaft 198 is rotatably supported between the plates and is arranged to slide in slots 199 in accordance with the setting of the set screws 200 carried by the plates and locked by check nuts 201. Mounted on this latter shaft 198 are sprockets 202.

Driven by sprockets 195 and meshing with idler sprockets 197 and 202 are a pair of chains 203 carrying at intervals the pressure pad slide brackets 204 supported therebetween in vertical orientation.

Carried on the spacers 192 are supports 205 adjacent the front edges of plates 191, Figures 17 and 19, is a guide rail 206 against which the slide brackets 204 bear in moving with their endless chains along the fronts of the plates 191.

Lugs 207 carried by the slides 204 engage each side of the guide rail 206 to hold these slides against vertical movement.

Mounted in the upper plate 191 are spaced C-shaped brackets or hangers 208 carrying the front guide rail 209 opposite rail 206 forming the rear guide rail. The slides 204 are thus accurately guided and supported in their travel along the front of the machine.

Supported from upper plate 191 at the forward edge is a bracket 210 having a horizontal upper flange 211.

Mounted for vertical adjustment on bracket 210 is a longitudinal cam 212 held outwardly by bracket 210 by spacers 213. The cam 212 is held in adjusted vertical position by the set screws 214.

Mounted in the slide brackets 204 are slide bars 215 carrying at their lower ends the U-shaped pad holders 216, Figure 19, on which are sleeved rubber tubing 217 to engage a container to be labelled while under tension.

Secured at their lower ends to the U-holders 216 and at their upper ends to the slide brackets 204 are springs 218 urging the slide bars 215 upwardly to move the pressure pads as formed by the tubing 217 upwardly and maintaining the rollers 219 carried at the upper ends of the slide bars 215 in engagement with the cam 212.

*In-feed mechanisms*

Figure 27:
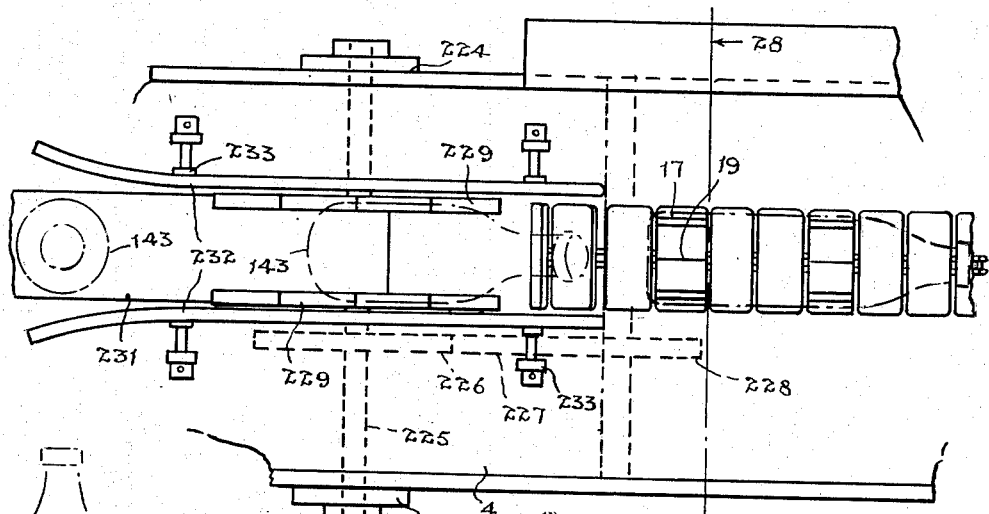
Figure 27 is a plan view of the mechanism of Figure 26.
Figure 28:
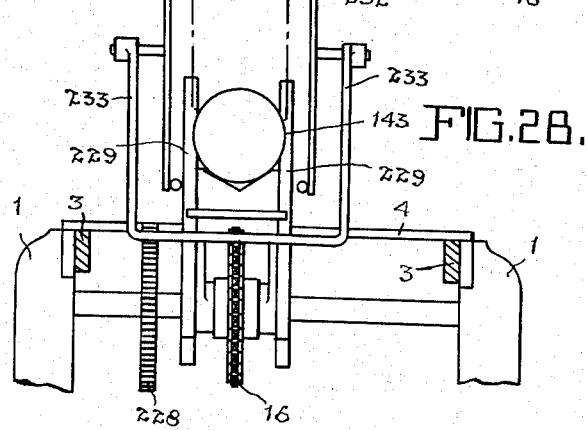
Figure 28 is a vertical section on the line 28—28 of Figure 27.
Figure 31:
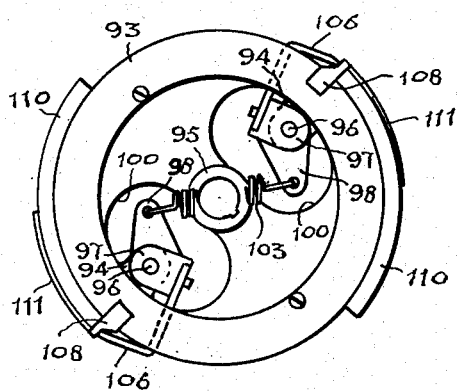
Figure 31 is an end elevational view of the label applying drum.

The bottles or containers 143 may arrive at the machine in either upright position or on their sides, as shown in Figure 2. Where the bottles are arranged to arrive on their sides in the position of Figures 1 and 2 they may be fed by gravity into the machine down the magazine 220 as guided by the guide rail 221. A pivotal latch 222 at the mouth of the machine may be arranged to prevent bottle in-feed onto the carrier 9 until the lug 14 has cleared the mouth of the magazine, and this latch 222 can be conveniently operated to clear the bottles by a cam 223 driven by the shaft driving sprocket 16 of the endless carrier.

Where the in-feed is to handle bottles or containers in an upright position when arriving at the machine the in-feed mechanism of Figures 26 to 28 is employed. In this mechanism side plates 224 extend from the left-hand end of the machine between which is journalled a shaft 225 having mounted thereon gear 226 meshing with pinion 227 driven by gear 228 mounted on shaft of sprocket 16.

The shaft 225 has mounted thereon a tumble wheel comprising a spaced pair of flanges 229 having sectors removed from diametrically opposed sections to provide the right angular steps 230, shown particularly in Fig. 26.

The bottles 143 are shown advancing towards the machine on an endless carrier 231 between the converging guides 232 mounted on the uprights 233 extending above the plates 4 as extended and forming the base plate of the machine. The bottles are delivered by carrier 231 in position to be received in one of the steps 230 of the paddle flanges as guided thereto by the guides 232. The rotating movement of the paddle wheel upsets the bottle, as clearly shown in Figure 26 to deposit it on the metal V-blocks 18 of the endless carrier 9 of the machine. The bottles then proceed through the machine in exactly the same manner as the bottles delivered by the magazine 220.

In the event that jamming of the bottles at the tumble wheel in-feed should occur a suitable latch may be arranged to interrupt bottle movement against the tumble wheel until the wheel is positioned for bottle reception.

Out-feed mechanism

At the discharge end of the machine it is desirable to deliver the bottles in an upright position after they have passed through the machine with their label-receiving surface inclined in the direction of motion.

Where the bottles are fed in by magazine 220, in accordance with Figures 1 and 2, the tumble wheel assembly of Figures 20 to 22 is employed to upright the bottles.

Extending beyond the frames 1 at the discharge end are extensions of the rails 3 as supports carrying, journalled therebetween, a shaft 236 carrying a tumble wheel in the form of spaced flanges 237 having right angularly projecting arms 238 and operating between guide discs 239.

The bottles 143 are conducted by the endless carrier 9 through the guide 240 in position to be picked up by the arms 238 and uprighted onto the platform 241 between the guides 242 on the discharge side of the tumble wheel. The drive of the tumble wheel comprises a gear 243 mounted on the shaft of the sprocket 16 of endless carrier 9, and a gear 244 mounted on shaft 236 and meshing with pinion 245 driven by gear 243.

Machine operation

The bottles or other containers are fed to the machine to be deposited on the metal V blocks 18 either by the gravity feed magazine of Figures 1 and 2 or the in-feed tumble wheel of Figures 26 to 28 in position to be advanced by a lug 17 of the carrier. The V of the blocks 18 serve to accurately align the bottles longitudinally of the carrier so that the labels will be correctly positioned. Entry of a bottle under the bottle weight is arranged to operate switch 142 either through the hinge plate 144 of the magazine assembly of Figures 1 and 2 or a suitable contact arranged in the path of the bottle in the tumble wheel in-feed mechanism.

Energization of the switch operates the solenoid 139 to rock latch 138 clear of bell crank 133 of the sucker arm control mechanism to permit the roller 135 of the bell crank 133 to follow cam 136 to operate the sucker arm. As the bottle advances the sucker arm following the movement permitted by cam 136 moves downwardly from its position of Figure 4. As the bottle, which has energized by solenoid 139 continues to advance the sucker arm moves downwardly to withdraw a label 120 from magazine 118 leading it downwardly with its forward edge projecting beyond the vacuum box 125 of the sucker arm.

Referring to Figure 4, prior to the downward movement of the sucker arm the one gripper jaw 104 approaching the magazine label as the label drum 92 is rotated anti-clockwise is being actuated to open through cam 113 and engaging roller 101 carried by the supporting bracket bar 97 of the jaw. The opposing jaw 104 having moved beyond the magazine and with its roller 101 riding off cam 113 has been actuated to the shut position to clamp against anvil bar 108 by action of spring 103.

This latter gripper arm is shown as clamping a label 120 overlying the label pad 111, but as the feeler arm 179 has not as yet been reached by the label the latch 184 has not been actuated to clear set screw 186 and the glue pot assembly, including roller 156, is maintained from movement about shaft 147 out of contact with the label drum.

Figure 6 shows the label drum revolved with the one gripper jaw in position ready to grip the forward edge of a label pulled down by the sucker arm 123. The other gripper jaw with the label in position has advanced partially passed roller 156 to receive an adhesive from glue pot 153, and it will be understood of course that the labels are fed to the label drum and are gripped with their reverse surfaces to receive the adhesive outwardly.

In the position of Figure 6 the label has passed beneath the feeler arm 179 operating latch 184 clear of the set screw 196, permitting the rocking of the glue pot assembly into position for application of adhesive by the spring 169.

Figure 7 shows a progressive step in the revolution of the drum. With the one gripper mechanism clamping the label with the label withdrawn from the sucker arm, the label carried by the other gripper jaw is shown advanced beyond the glue pot roller, and moving to adjacent the bottle surface, cam 176 has returned the glue pot away from the label drum, and spring 188 as permitted by the dropping of the feeler arm 179 off the label pad 111 has returned the latch 184 to beneath the stop set screw 186 to prevent subsequent operation of the glue pot assembly until the label overlying pad 111 forces the feeler arm 179 out of slot 112 to rise on top of the label.

It will be seen that the rollers 80 maintain the label in position on the pad as the feeler arm rides over the label, and with the label gripper between a jaw and anvil bar 108, and due to the bevelled forward face 109 of the bar the feeler arm will ride up smoothly on the label.

As the portion of the carrier 9 on which the bottle to be labelled is carried approaches the label drum it rides up on the supporting strips 267 cushion-supported on the resilient strips 268 so that the rollers of the chain clear the longitudinal bearing bar 15' and accommodate variations in container dimensions.

The surface speed of the periphery of the label drum and the surface speed of the bottle are precisely the same, as both the carrier and label drum are driven from the main drive shaft 40 through the drive mechanism described, and any change in motor speed will be felt equally in these mechanisms. The label upon continued motion of the label drum is therefore brought into line contact with the bottle surface with zero relative velocity between the label and bottle in the direction of bottle movement, and the resilient strips 268 permit sufficient preessure without bottle breakage between the label drum and the bottle to provide sufficient adherence even in line contact to release the label from the drum as the gripper jaw is actuated to open by its cam 113. As the bottle moves beyond the label drum it rides down off the resilient supported strips 267 and beneath a pressure pad 217 as the presser is operated downwardly by cam 212 into pressure contact with the label and the bottle while conforming to the rounded bottle surface, as particularly shown in Figure 16.

Again the pressure pads 217, operated in their slide brackets 204 by cam 212 for application of labelling pressure, move longitudinally of the machine above endless carrier 9 at the same surface speed as the carrier, so that contact pressure is maintained over an extended portion of carrier travel and hence over an extended interval of time without relative motion between the pressure applicator and the label and bottle, so that the label is firmly adhered before pressure release.

At the discharge end of the machine the bottles are uprighted with the tumble wheel assembly of Figures 20 to 22.

The machine may be operated at any desired speed through control of the hand wheel 32 operating the motor drive control mechanism 22 of Figures 1 and 11 to 13.

While the surface speed of the periphery of the label drum, the presser pads and the carriers are maintained at all times equal, the timing between the carrier and the label drum and also the presser pads can be controlled to deposit the labels in the correct position on the bottles. This timing mechanism of Figures 14 to 16 and operated by hand wheel 50 to rock rock arm 46 to advance or retard the endless carrier relative the main drive shaft 40 permits an accurate and instant control of this timing relation.

In the event of interruption of bottle feed into the machine solenoid 139 will remain de-energized and rock latch 138 as held by spring 141 will prevent operation of the sucker arm 123 to prevent a label from being pulled down to be gripped by one of the jaws 104 of the label drum mechanism.

The absence of the label will permit feeler arm 179 to ride in slot 112 provided in the label pads 111, maintaining latch 184 inoperative to prevent actuation of the glue pot assembly against the label drum. Thus the absence of a bottle automatically functions to prevent label feed and subsequent adhesive application to prevent wastage of labels and blocking of the machine by the adhesive.

In the event the shape of the label is to be changed the drum segments 110 are removed and replaced by similar segments bearing label pads 111 conforming in contour to the new label to be used but of slighter smaller dimension and subdivided by the groove or slot 112.

In the event the bottles are to be changed platform 63 and the mechanisms mounted thereon are adjusted in height according to the diameter or dimension of the new bottle or container. This adjustment is carried out by operating hand wheel 73 to operate rack bars 64 carrying the platform. Elevation of the platform 63 does not alter the drive of the mechanisms on the platform as driven by the main drive shaft 40 through a vertical shaft 77 with keyway 78 permitting relative movement between shaft 77 and worm wheel 76 driven by the worm or spiral 75 of the main drive shaft.

With the machine a light pressure on the bottle by the label drum permits a label to be adhered sufficiently to the bottle along the line contact to ensure that the label leaves the drum upon opening of the gripper jaw 104 without displacement on the bottle surface until the presser pads 217 engage and conform into the shape of the bottle surface to firmly press the label throughout its entire surface area into bottle contact and to maintain such pressure over an extended period sufficient to effect the secure adhesion of the label in position.

It is to be noted that by bringing the label into contact with the bottle surface while travelling in the direction of the bottle at precisely the same surface speed and by bringing pressure on the deposited label by a pressure element moving also with the same surface speed as the bottle, the labelling is done without interruption of bottle movement through the machine. The machine has been found to operate efficiently by virtue of the continuous bottle movement at a rate of over one hundred bottles per minute with bottle breakage negligible. By cushioning the bottle beneath the drum and by providing the yielding pressure pads the bottle breakage on extended tests has been essentially completely eliminated. This is an important factor over present machines where bottle breakage is exceedingly high and where the capacity of the machine is reduced to a small proportion of the capacity of the present machine wherein feed through the machine is uninterrupted at any stage of the labelling.

It will be understood that various modifications of the machine may be made without departing from the scope of the invention.

What we claim as our invention is:

1. A machine of the class described comprising a main frame unit, a motor mounted on said frame, a main drive shaft driven by said motor, an endless chain conveyor operating longitudinally of said main frame, a drive between said conveyor and main drive shaft, a platform supported above said main frame for vertical sliding movement, elevating means operating said platform vertically, a vertical drive shaft carried by said platform, a spiral drive between said main and vertical drive shafts permitting vertical motion of said vertical shaft, a label drum rotatably mounted on said platform and overlying said conveyor, a drive between said vertical shaft and label drum to drive said drum at the surface speed of said conveyor, a label magazine mounted above said drum, a sucker device associated with said label magazine and movable to withdraw a label therefrom, a gripper mechanism carried by said label drum and operated to grip a label withdrawn by said sucker device and to release upon carrying a label, a container on said conveyor therebetween, and a glue pot assembly including a glue roller rockably mounted on said platform to move into contact with the label held by said gripper mechanism, means actuated by reception of a container on said conveyor to render said sucker device operative to withdraw a label from said magazine, means actuated by a label gripped by said gripper mechanism for rendering said glue pot assembly operative to rock into label contact position, and presser means supported on said platform for movement above said conveyor over an extended length of conveyor travel beyond said drum and driven from said vertical shaft at the surface speed of said conveyor.

2. A machine as claimed in claim 1 in which the drive between said main drive shaft and conveyor comprises a shaft on which a conveyor sprocket is mounted, a drive sprocket on said shaft, a drive sprocket on said main drive shaft, a rock arm pivoted intermediate its length between said drive sprockets, idler sprockets mounted on each end of said rock arm, a pair of fixed idler sprockets, a drive chain extending between said drive sprockets and having each reach therebetween passing around an idler sprocket on said arm and a fixed idler sprocket to provide a double reverse in said chain reach, and means operating said arm to rock said idlers carried thereby.

3. A machine as claimed in claim 1 in which the presser means comprises an endless carrier operating in the vertical plane supported on said platform and extending for a reach of its travel over said conveyor and driven by said vertical shaft, vertical slide brackets carried by said carrier, bars vertically slidable in said brackets and formed with inverted U lower ends, a yieldable material closing the U of said lower ends, spring means urging said bars upwardly of said slide brackets, and cam means operating said bars downwardly when over said conveyor.

4. A device as claimed in claim 1 in which said chain conveyor comprises a roller chain having links formed with bearing plates, V blocks mounted on certain of said plates, lugs mounted on other of said plates, and said main frame is provided with resiliently supported wear strips located beneath said drum and over which said plates ride to resiliently support said conveyor under pressure of said drum on a container mounted on said V blocks and engaged by one of said lugs.

5. In an automatic labelling machine, the combination of an endless carrier moving in uninterrupted motion, a rotatable drum mounted above said carrier and provided with one or more gripper jaws adapted to be operated into and out of gripping relation, means for operating said jaws at definite times during rotation of said drum, a label magazine, a sucker device adapted to withdraw a label from said magazine into the path of said gripper jaws to be gripped thereby, means controlled by the presence of a container on said carrier to operate the sucker means at definite times during rotation of said drum, a glue pot assembly rockably mounted adjacent said drum and adapted to be rocked into position to apply adhesive to a label carried by said jaws, and means actuated by the presence of a label gripped by said jaws to rock said glue pot, the whole operating for the purpose of delivering a label presenting a tacky side from said magazine to a container on said carrier while moving the label and container at the same surface speed.

6. An automatic labelling machine comprising the combination of an endless carrier moving with uninterrupted motion and adapted to carry containers with their surfaces to be labelled presented lengthwise of the carrier, a rotatable drum mounted above said carrier rotating at the surface speed of said carrier and provided with one or more gripper jaws adapted to be operated into and out of gripping relation, means for operating said jaws at definite times during rotation of said drum, a label magazine, a device adapted to withdraw a label from said magazine into the path of said gripper jaws to be gripped thereby, means controlled by the presence of a container on said carrier to operate said device at definite times during rotation of the drum, means operable to move into contact with a label held by said jaws to render said label tacky, means actuated by the presence of a label gripped by said jaws to effect movement of said latter means into label contacting position, pressure means moving above said carrier at the speed of said carrier and vertically slidable into label and container pressing position, and means effecting vertical operation of said presser means into and out of label pressing relation.

7. A device as claimed in claim 6 in which a timing apparatus is provided to control the timing relation between said carrier and said drum and presser means.

8. A machine of the class described comprising a main frame unit, an endless carrier mechanism operating longitudinally of said main frame to conduct a container through the machine, drive means driving said carrier, a platform, rack bars vertically slidable relative said main frame supporting said platform above said main frame for vertical adjustment, an elevation shaft journalled in said main frame, pinion means driving said rack bars from said elevating shaft, an extensible drive from said main frame to said platform and driven from the aforesaid drive means, a rotary label-applying device carried by said platform and overlying said carrier, an endless carrier mounted on said platform and extending for a portion of its travel over the aforesaid carrier, presser means carried by said second-mentioned carrier and mounted for vertical reciprocation, means connecting said extensible drive with said rotary label-applying device and said second endless carrier to drive same in speed synchronism with said first carrier, and timing means interposed in said first-mentioned carrier drive means to adjustably advance and retard said first-mentioned carrier relative said label-applying device and presser means to correctly register containers on said first-mentioned carrier with said label-applying device and said presser means.

9. A machine for labelling containers comprising in combination, an endless carrier to conduct a container in linear straight line motion through the machine, rotary label-applying means mounted at a fixed point above said carrier to deposit a label on a container on said carrier, presser means mounted to travel in a linear straight line path above said carrier for a portion of its travel, said presser means being vertically reciprocal towards and away from said carrier, means driving said endless carrier, means driving said label-applying and presser means above said carrier at the surface speed of said carrier, and means interposed in said carrier driving means to adjustably advance and retard said carrier relative said label-applying and presser means to correctly register containers on said carrier with said and label-applying presser means.

10. In a machine for labelling containers, an endless chain conveyor, label-applying means arranged above said conveyor to deposit a label on a container carried by said conveyor, presser means mounted to travel above said conveyor and vertically reciprocal to move towards and away from said conveyor, drive means operating said conveyor and presser means at the same speed of travel, the drive means for said conveyor including an endless chain drive connecting a driving sprocket to a driven sprocket connected with said conveyor, and means to control the timing relation between said conveyor and said presser means comprising a rock arm pivoted intermediate its length between said sprockets, idler sprockets mounted on each end of said rock arm, and a pair of fixed idler sprockets, said endless chain having each reach between said first-mentioned sprockets passing around an idler sprocket on said arm and a fixed idler sprocket to provide a double reverse in said chain reach, and means operating said arm to rock said idlers carried thereby.

11. A machine for labelling containers comprising in combination, an endless carrier to conduct a container in linear straight-line motion through the machine, a platform vertically adjustable above said carrier, means for vertically adjusting said platform, rotary label-applying means mounted at a fixed point on said platform above said carrier to deposit a label on a container on said carrier, presser means carried by said platform and mounted to travel in a linear straight-line path above said carrier for a portion of its travel, said presser means being vertically reciprocal towards and from said carrier, means driving said endless carrier, means driving said label-applying and presser means mounted on said platform above said carrier at the surface speed of said carrier, and means interposed in said carrier driving means to adjustably advance and retard said carrier relative said label-applying and presser means to correctly register containers on said carrier with said label-applying and presser means.

References Cited in the file of this patent

UNITED STATES PATENTS

| Number | Name | Date |
|---|---|---|
| 1,311,643 | Fischer | July 29, 1919 |
| 1,567,149 | Kallenbach | Dec. 29, 1925 |
| 1,682,406 | Nejedly | Aug. 28, 1928 |
| 1,750,943 | Schroeder | Mar. 18, 1930 |
| 1,998,067 | Arelt et al. | Apr. 16, 1935 |
| 2,167,356 | George | July 25, 1939 |
| 2,259,445 | Arelt | Oct. 21, 1941 |
| 2,280,730 | Talbot | Apr. 21, 1942 |
| 2,336,839 | Blackstone | Dec. 14, 1943 |
| 2,391,694 | Everett | Dec. 25, 1945 |